United States Patent Office 3,553,947
Patented Jan. 12, 1971

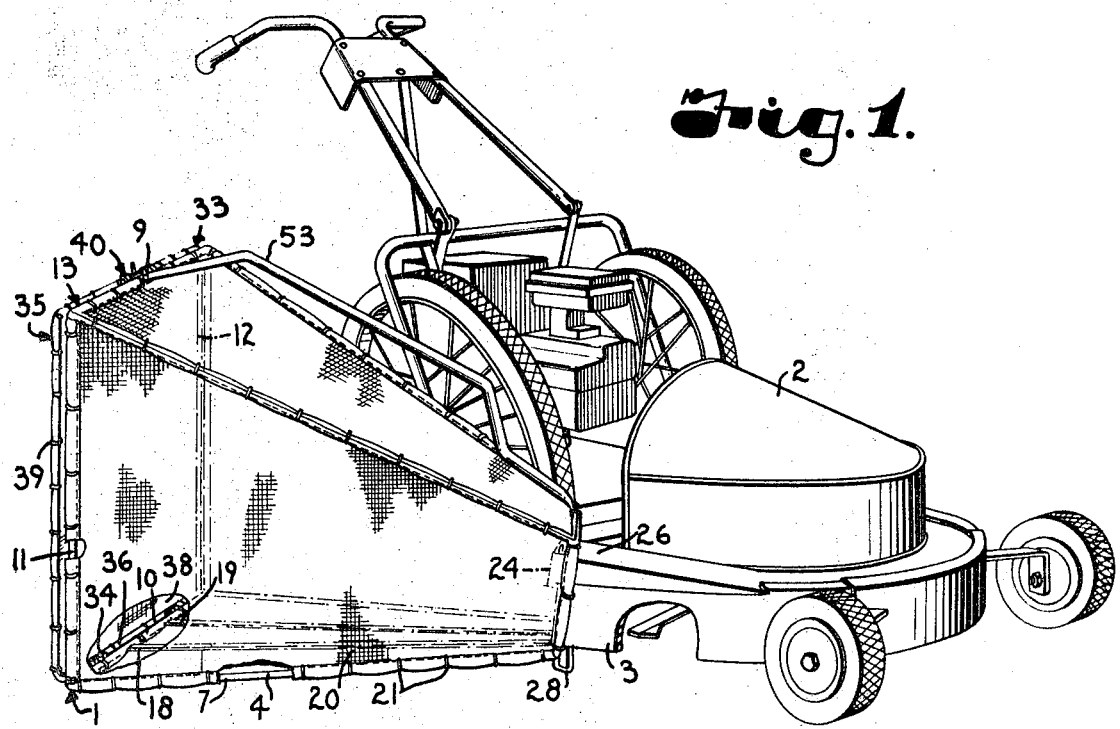
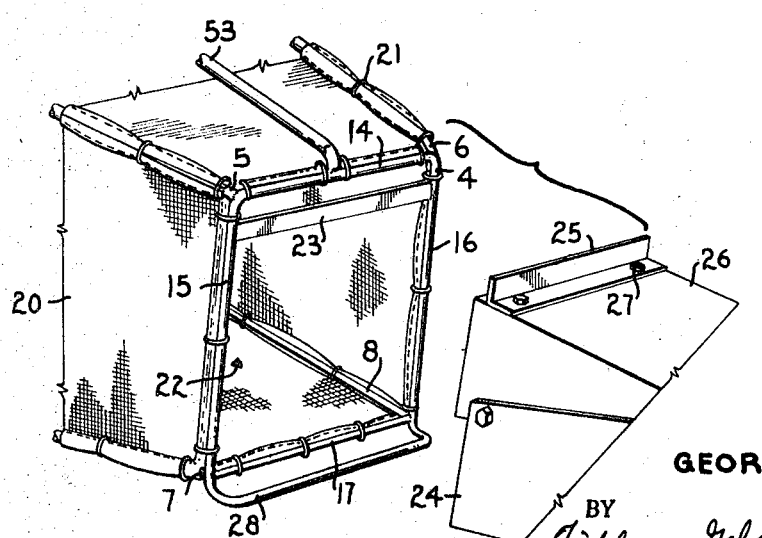

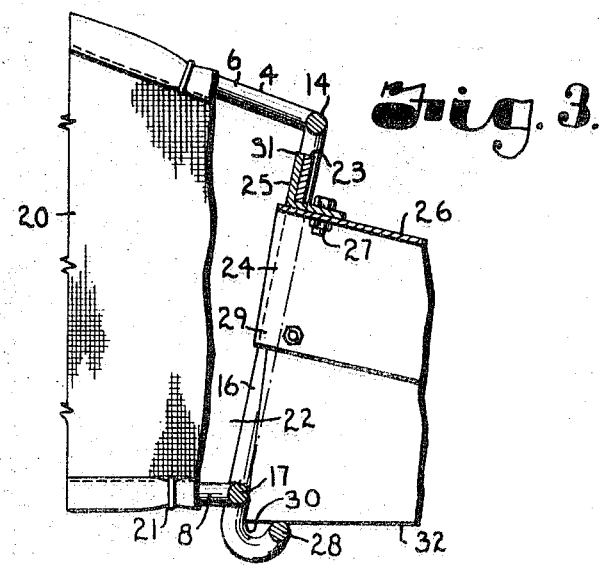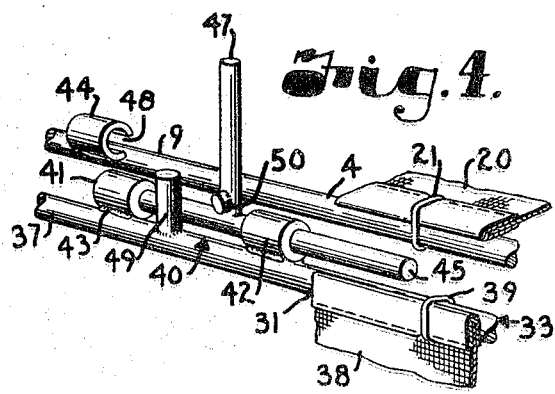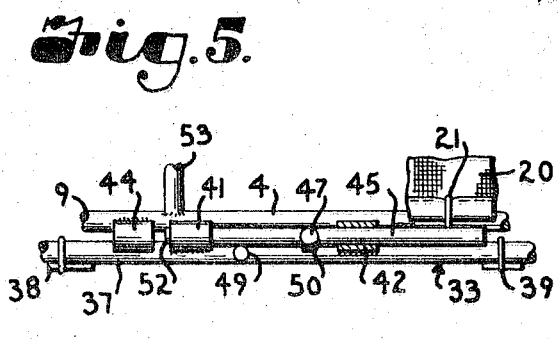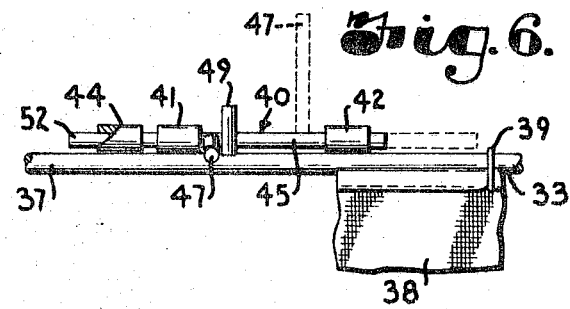

3,553,947
GRASS CATCHER FOR LAWNMOWERS
George R. Root, Baxter Springs, Kans., assignor to Root Manufacturing Company, Inc., Baxter Springs, Kans., a corporation of Kansas
Filed Aug. 12, 1968, Ser. No. 751,790
Int. Cl. A01d 35/22
U.S. Cl. 56—202
8 Claims

ABSTRACT OF THE DISCLOSURE

This invention relates to an apparatus for attaching one end of a grass catcher to the housing of a lawnmower by means of a bracket and a hook member on the catcher which engages underneath the spout of the housing and to the hinged door at the opposite end of the catcher and means for locking the same in place.

Heretofore, in catchers of this type, there has usually been bolts and nuts required or some resilient means such as springs on the forward end of the catcher to attach the same to a discharge chute or spout of a housing of a lawnmower for easy removal. Also, in catchers of screen type, there has been no easy and quick way of opening the rear end to remove the grass therefrom.

---

It is the principal object of the present invention to provide the housing of the lawnmower with a spout or discharge chute with an angle bracket across the top thereof; to provide the forward end of the catcher with a frame having a top portion which will hook over the angle bracket on the discharge chute and having a bar on the lower end of the frame of the catcher which has a portion engaging underneath the chute and preventing upward movement thereof, and a portion resting against the forward or free end of the chute to retain the frame in position above the ground as the mower is moved therealong; to provide means whereby the catcher can only be removed from the chute by raising the rear end thereof to remove the bracket on the lower forward end from underneath the chute, and then the forward end raised to release the upper bar on the catcher to be released from the channel bracket.

Further objects of the present invention are to provide a framework for the catcher, here shown to be made of rod material and smaller at the forward attaching end than the rear or door end; to provide the bottom, sides and top thereof with screening to retain the clippings from the mower; and to provide a hinged door for the rear of the catcher.

Other objects of the present invention are to provide a hinged door for the rear of the catcher attached by hinge members at the lower rear end of the catcher which swings outwardly and downwardly from the top thereof; to provide locking means at the top of the door and on the top bar across the rear end of the catcher to hold the door in closed position during use and eliminate the likelihood of accidental unlocking of the door due to vibration under general mowing conditions; to provide a handle for the catcher for carrying the catcher for unloading the same when filled and replacing the same on the mower; and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view of my catcher shown attached to the discharge chute of a lawnmower.

FIG. 2 is an enlarged partly fragmentary view of the catcher, showing the means for fastening the same to the discharge chute of the mower.

FIG. 3 is an enlarged fragmentary view of the forward portion of the catcher, partly in cross section, showing the same attached to the discharge chute.

FIG. 4 is an enlarged fragmentary view of the locking mechanism for the door of the catcher.

FIG. 5 is a fragmentary plan view of the locking mechanism.

FIG. 6 is a fragmentary rear elevational view of the locking mechanism.

Referring more in detail to the drawings:

1 designates a grass catcher for a lawnmower, designated 2, having a discharge chute 3. The lawnmower is the usual wheeled type adapted to be moved over the lawn as is the usual practice, and as is usual with grass catchers, the purpose is to provide a catcher that will extend as near parallel with the mower as possible to prevent lateral extension from the mower which prevents mowing close to trees, fences, and the like.

The catcher 1 is comprised of a frame 4, here shown to be of rod-like structure, having top rods 5 and 6 and bottom rods 7 and 8. The top rods are connected at their rear ends by a bar 9 and the bottom by a bar 10 and upright bars 11 and 12 forming an opening 13 of the catcher. The upper rods 5 and 6 are tapered inwardly and downwardly and are connected by a top bar 14, side bars 15 and 16, and a bottom bar 17. The bottom of the framework structure of the catcher is provided with spaced rods 18 and 19, having their respective ends secured to the cross bar 10 at the rear end and the cross bar 17 at the forward end in order to lend rigidity to the structure.

The bottom, sides and top of the catcher are provided with a screen structure as indicated at 20 to retain the clippings therein. The screenwork is secured around the rods as illustrated in FIG. 1 by fastening devices or rings 21 spaced along the rods, as is the usual procedure. A special tool (not shown) is used for placing the rings around the screen and rods.

The forward end of the chute has an opening 22 and spaced downwardly from the top rod 14 is a cross bar 23. It will be noted the opening 22 is slightly larger, or sufficiently larger than the rear end 24 of the chute, so that the end of the catcher will engage thereover. An L-shaped bracket member 25 is secured to the top 26 of the chute by bolts or the like 27, and one angle of the bracket extends upwardly from the chute. The lower ends of the rods 15 and 16 are curved downwardly and forwardly forming a cross rod 28 slightly lower than the bottom rod 17 of the frame. The rear end 24 of the chute is offset as shown at 29 (FIG. 3). When the catcher is attached to the chute, the cross rod 17 will rest against the rear edge of the chute as shown at 30 (FIG. 3).

In order to secure the catcher to the discharge chute, the rear end of the catcher is raised upwardly so that the forward opening 22 will go over the end 24 of the chute, and the cross bar 23 will hook over and engage the upwardly extending portion 31 of the bracket 25. Lowering of the rear end of the catcher will cause the cross rod 28 to move under the chute and contact lower edges 32 of the sides of the chute, as shown in FIG. 3, and retain the catcher aboveground and suspend the same from the chute of the lawnmower. In order to remove the catcher from the chute, the rear end of the catcher is raised upwardly until the rod 28 will pass the rear end of the chute, and then upward movement of the forward end of the chute will disengage the cross bar 23 from the bracket 25.

In order to close the rear end of the catcher, a door 33 is provided, hingedly connected to the cross bar 10 of the bottom of the catcher by spaced hinges, as indicated at 34 (FIG. 1), so that the door swings outwardly and downwardly from the top of the catcher. The door has a rectangular frame completely therearound as indicated at 35 which includes a cross rod 36 at the bottom and a cross rod 37 at the top. The door is covered with screening 38, as are the other parts of the catcher, and the screen being attached thereto by rings or fasteners 39.

In order to securely fasten the door 33 in closed position, a locking mechanism 40 is provided, and will now be described.

By reference to FIGS. 4, 5 and 6, it will be noted that that spaced ears or sleeves 41 and 42 are provided on the bar 37 by welding or other suitable means, as indicated at 43, and a sleeve member 44 is welded or otherwise suitably secured to the cross bar 9 on the top of the rear end of the catcher, as best shown in FIG. 4. A locking pin 45 is provided for movement through the sleeves or ears 41 and 42, and one end 46 thereof is adapted to engage in the sleeve 44, as now to be described.

An arm 47 is rigidly secured to the locking pin 45 and extends in its unlocked position upwardly from the pin 45. When it is desired to lock the gate or door of the rear end of the catcher in closed position, the door is closed against the rear end of the catcher until it assumes the position shown in FIG. 5, so that the locking pin 45 is in alignment with the opening 48 of the sleeve 44, so that when the pin 45 is moved to the left, the arm 47 will be extended behind an upwardly extending pin 49, as shown in FIG. 6. The pin 45 is then rotated rearwardly or in an anti-clockwise direction until the arm 47 is in a substantially horizontal position. If desired, a stop member 50 may be provided near the base of the arm 47 so that it will engage the cross rod 37 of the door when the bar is in locked position.

It will be obvious from the foregoing that this locking member will eliminate the possibility of vibration under general mowing conditions and prevent unlatching of the back portion of the catcher.

When it is desired to empty the contents of the catcher, the catcher is removed from the discharge chute as previously described, and then the door 33 may be unlocked by raising of the arm 47 to rotate the pin and then move the same to the right to disengage the end 52 from the sleeve 44 so that the door will swing on its hinges. A handle 53 extends parallel over the top of the catcher and has its ends rigidly secured to the cross rods 9 and 14. The handle 53 also lends rigidity to the catcher.

The catcher, after it is removed from the chute, may then be transported to a place of disposal of the clippings therein. The taper of the catcher provides for easy removal of the clippings through the rear opening thereof.

It is to be understood that while one form of the invention has been illustrated and described, it is not to be limited to the specific form or arrangement of parts herein described and shown except insofar as such limitations are included in the claims.

What I claim and desire to secure by Letters Patent is:

1. The combination of a grass catcher for attachment to a rotary lawnmower having a housing and a discharge chute extending outwardly from said housing, said chute having a top and side walls having rear end lower edges; and a bracket on the top of said chute extending transversely thereacross near the open end of said chute;
   (a) said catcher having a rigid frame and a front opening and a rear opening and a door for said rear opening,
   (b) means for removably attaching the open front end of the catcher to said chute,
   (c) a cross bar extending across the front opening of said catcher near the top thereof adapted to engage said bracket on said chute, and
   (d) a cross rod connected to said open end of the frame of the catcher and etxending below and forwardly of said open end to engage the lower edges of the sides of said chute and the frame of the front opening engaging the rear edges of said sidewalls to suspend said catcher from said chute.

2. The apparatus of claim 1, wherein a portion of the frame around the front opening of the chute engages a portion of the rear edge of said chute to aid in suspension of said catcher to said chute.

3. The apparatus of claim 1 wherein said bracket includes an elongated upwardly extending flange and said cross bar extending across the opening of said catcher is an elongated flat bar to engage said flange.

4. The apparatus of claim 1 including means swingingly attaching said door to the bottom of the rear end of said chute, and means locking said door in closed position at the top of said chute.

5. The apparatus of claim 1 wherein said catcher is elongated and said frame is made of rods including upper rods converging inwardly toward each other and downwardly toward the forward end and said lower rods converge toward each other at their forward ends.

6. The apparatus of claim 5 including a covering for said catcher of perforated material, and means for securing said covering to said frame.

7. The combination of a grass catcher for attachment to a rotary lawnmower having a discharge chute extending outwardly from said housing,
   (a) said catcher having a rigid frame and a front opening and a rear opening and a door for said rear opening,
   (b) means for removably attaching the open front end of the catcher to said chute,
   (c) the rear opening in said catcher being formed by a top cross rod and a bottom cross rod of said frame, a sleeve on said top cross rod,
   (d) hinge means for attaching said door to the lower cross rod, said door including a frame with a cross rod at the top thereof, spaced sleeves on said last named cross rod,
   (e) a locking pin rotatable and movable transversely in said sleeves, said pin having an arm extending outwardly thereof and located between said sleeves,
   (f) a pin on said top cross rod on said door between said sleeves and out of longitudinal alignment with said sleeves, whereby closing of said door will align said sleeves on the door with the sleeve on the frame of the catcher so that said locking pin can be moved by said arm to the left and then rotated anti-clockwise to engage said arm behind said pin.

8. The apparatus of claim 7 wherein said pin is spaced from one of said sleeves on said cross rod of the door a sufficient distance to allow the arm to engage between said last named sleeve and said pin.

References Cited
UNITED STATES PATENTS

| | | | |
|---|---|---|---|
| 2,855,745 | 10/1958 | Phelps | 56—202 |
| 3,099,123 | 7/1963 | Price | 56—202 |

ROBERT PESHOCK, Primary Examiner